United States Patent [19]

Gaspardo

[11] Patent Number: 4,546,670
[45] Date of Patent: Oct. 15, 1985

[54] CONNECTING-ROD SYSTEM PARTICULARLY FOR MOWERS

[76] Inventor: Luigi Gaspardo, Via Mussons 7, Morsano Al Tagliamento (Pordenone), Italy

[21] Appl. No.: 462,008

[22] Filed: Jan. 28, 1983

[30] Foreign Application Priority Data

Mar. 16, 1982 [IT] Italy ............... 21152/82[U]

[51] Int. Cl.[4] .............. F16C 3/06; F16B 21/00; F16D 1/00
[52] U.S. Cl. ................... 74/595; 74/579 E; 123/197 AC; 403/324; 403/378
[58] Field of Search .......... 74/579 R, 579 E, 595, 74/596, 597; 123/197 AC; 29/156.5 A; 403/324, 378, 379, 355

[56] References Cited

U.S. PATENT DOCUMENTS

| 1,006,895 | 10/1911 | Albree | 74/579 |
|---|---|---|---|
| 1,646,288 | 10/1927 | Graham | 74/597 |
| 2,364,109 | 12/1944 | Taylor | 74/597 |
| 2,471,982 | 5/1949 | Shulda | 74/597 |
| 2,755,093 | 7/1956 | Peter et al. | 74/597 |
| 3,147,638 | 9/1964 | Rice | 74/595 |

Primary Examiner—Gary L. Smith
Assistant Examiner—Vinh Luong
Attorney, Agent, or Firm—Ladas & Parry

[57] ABSTRACT

A connecting-rod system for mowers in particular, wherein, for actuating elements driven by alternate motion, there are used rods mounted on a crank which can be linked to the drive shaft by fitting a crank pin into a seat in the shaft itself. On the crank pin there is at least one flat wall intended for properly positioning the crank pin itself by interacting with a corresponding flat wall provided in said seat.

7 Claims, 2 Drawing Figures

CONNECTING-ROD SYSTEM PARTICULARLY FOR MOWERS

The present invention provides for a connecting-rod system for actuating the mower blades by means of a shaft connected to the power take-off of an agricultural tractor.

The device according to the invention is especially suitable for actuating mower blades or the like, and its characteristics make the use thereof advisable in all those circumstances wherein it may be necessary to repair agricultural machines and the shop is not near. As it is known, mowers generally consist of a framework on which there are mounted two blades that are run at a high speed, with alternate and contrary motion, generally by means of a shaft connected to the tractor. Motion is transmitted to the blades by means of two devices fastened to the ends of the blades. These elements are subject to considerable wear, due to both the characteristics of the motion exerted on them and the environmental conditions in which they work. It often happens, therefore, that something breaks down or fails, and this makes it necessary to take the machine to pieces in order to repair it.

While these operations do not present particular difficulties if carried out in the repair shop, some problems arise when it is necessary to remove and assemble again the pieces far from the shop, and when suitable instruments are not available. Problems are even great when timing of the different components is required.

To obviate the above inconveniences the present invention provides for a connecting-rod system, the proper assembling and exact timing of which are made easier by the special shape of the components thereof.

The present invention will be now described in detail, with special reference to the accompanying drawings, in which.

Figure 1:
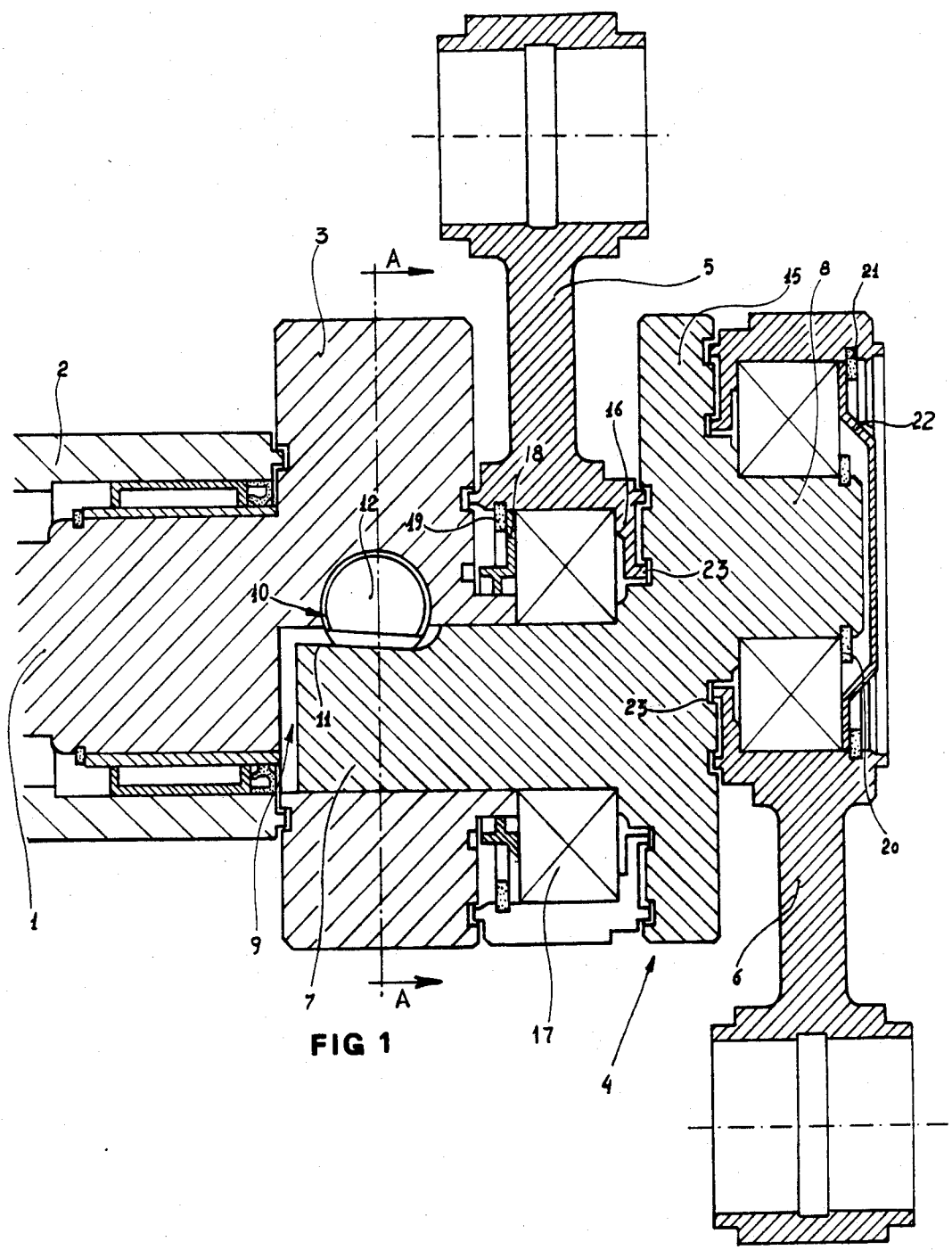
FIG. 1 is the section of a connecting-rod assemble according to the invention.
Figure 2:
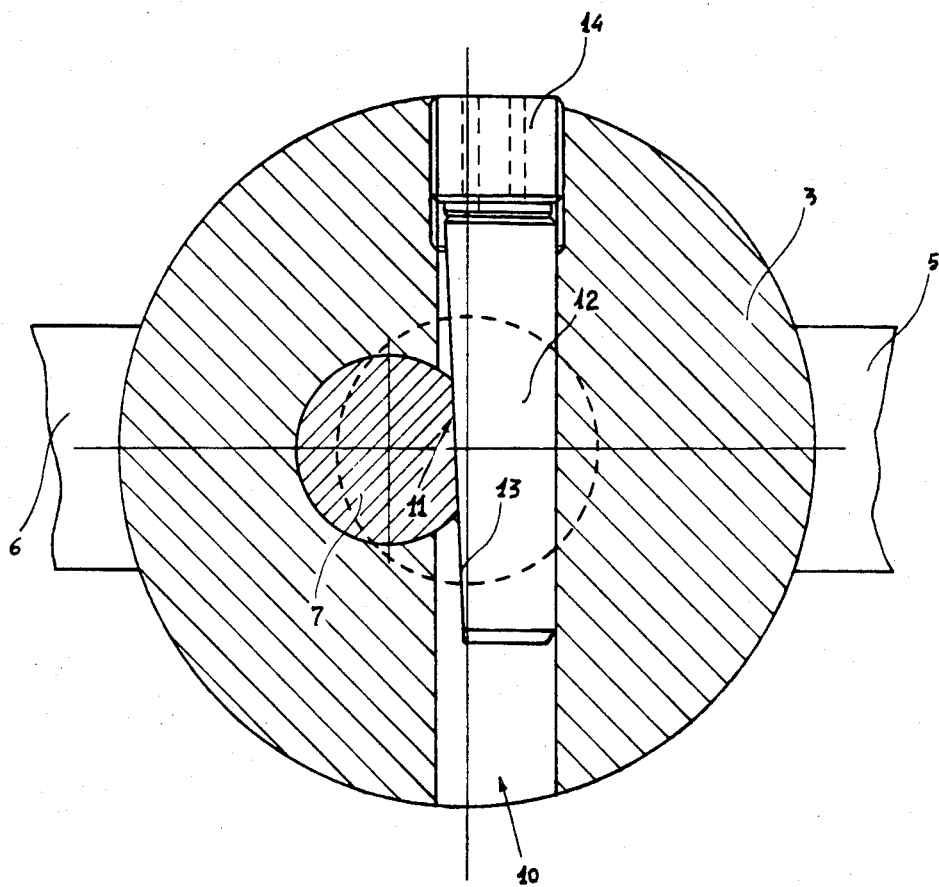
FIG. 2 is the section along the line A/A of FIG. 1.

With reference to FIG. 1, a driving shaft 1, mounted inside a sleeve 2, has an end head 3 in which there is inserted a crank indicated in its whole by 4, supporting a couple of rods 5 and 6. Crank 4 comprises two crank pins 7 and 8 which, when said crank is mounted, are at opposite sides with respect to axis BB of shaft 1. In head 3 there are made a blind hole 9 whose axis is sustantially parallel to axis BB, as well as another blind hole 10, perpendicular to the first one. The distance between the axes of holes 9 and 10 is inferior to the sum of their radius. Into aperture 9 there is fitted the crank pin 7 which has, laterally, at least one inclined flat wall 11.

The inclination of wall 11 is such that its distance from the axis of the crank pin 7 is greater as we advance towards the extremity of the crank pin itself.

Into hole 10 there is fitted a stop pin 12 or the like, having too an inclined wall 13 which interacts with wall 11 clamping thus element 7. Said pin 12 is then clamped by means of a grub screw 14 or the like.

The arm 15 of crank 14 serves for positioning rods 5 and 6 when they are mounted on the crank pins 7 and 8. The head of rod 5 has a side wall 16 of shorter diameter, so as to serve for clamping in position a bearing 17 mounted on the crank pin 7.

A sealing ring 18 holds bearing 17, and the whole is kept in position by means of an elastic ring 19 which fits a proper seat made in the head of rod 5. Likewise, rod 6 along with its bearing is secured to crank pin 8 by means of an elastic ring 20, while another such ring 21 keeps a protecting lid 22 in place. The heads of rods 5 and 6 carry also a series of protruding ring-like elements of the like 23, which fit into proper seats in the crank arm 15 and in head 3 of shaft 1.

The assembling takes place in this manner: first bearings are inserted in the heads of rods 5 and 6, which are then mounted on the crank pins 7 and 8, where they are held by means of elastic rings 19 and 20.

The crank-rod unit is now ready to be fixed to head 3 of shaft 1.

The end of the crank pin 7 is inserted in hole 9 where it is clamped and properly positioned by means of pin 12.

The result is a connecting-rod system which can be applied exactly and quickly using few simple instruments.

Of course the sizes as well as the employed materials may vary in accordance with the different requirements of use.

I claim:

1. A connecting rod system particularly suited for mowers,
comprising in combination,
a crank,
rods mounted on said crank for actuating elements driven by alternate motion,
a driveshaft including a head, the head of said driveshaft having a seat,
a crank pin for linking said crank to the head of said driveshaft, said crankpin including at least one inclined wall, one end of said crank pin fitting into the seat of the head of said driveshaft,
a stop pin including an inclined wall which interacts with the inclined wall of said crankpin to properly position and clamp said crank pin in said seat.

2. A connecting rod system as claimed in claim 1, wherein said head has a hole perpendicular to said seat, the distance between the axes of said seat and said hole being less than the sum of their radii, said stop pin is fitted into said hole and the inclined wall of said stop pin interacts with the inclined wall of said crank pin to properly point and clamp said crank pin in said seat.

3. A connecting rod system as claimed in claim 1, wherein the inclined wall of said crank pin tapers outwardly in the direction of the end of the crank pin inserted in said seat.

4. A connecting rod system according to claim 1, including more than one crank pin and wherein said crank includes an arm for positioning said rods which are mounted on said crank pins.

5. A connecting rod system according to claim 4, wherein the crank pins supporting said rods are of a single piece.

6. A connecting rod system as claimed in claim 4, wherein said rods each have a head, including a series of protruding ring-like elements which fit into seats of the crank arm and in the head of said drive shaft.

7. A connecting rod system as claimed in claim 4, said rods each having a head and wherein bearings are inserted in the heads of said rods and said bearings are then mounted on said crank pins and held by means of elastic rings.

* * * * *